United States Patent Office 3,294,201
Patented Dec. 27, 1966

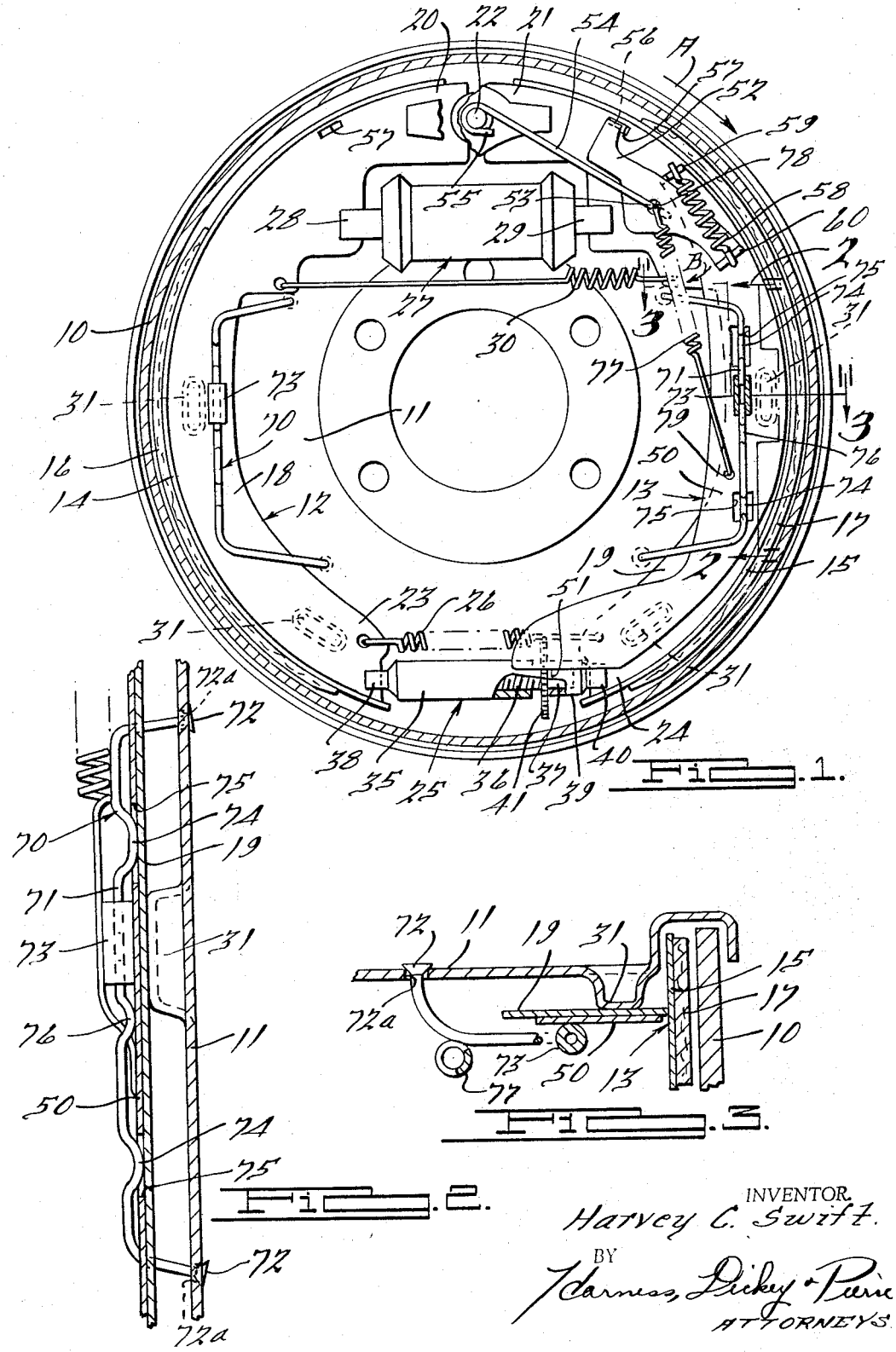

3,294,201
AUTOMATIC BRAKE ADJUSTER
Harvey C. Swift, Birmingham, Mich., assignor to Kelsey-Hayes Company, Romulus, Mich., a corporation of Delaware
Filed July 31, 1964, Ser. No. 386,640
3 Claims. (Cl. 188—79.5)

This invention relates to brakes of the type comprising an annular brake drum and arcuate brake shoes and, more particularly, to means for automatically adjusting the brakes.

It is an object of this invention to provide a brake adjusting means which operates automatically during the braking cycle to maintain a predetermined clearance between the brake shoes and drum.

It is a further object of this invention to provide automatic brake adjusting means which operates only when the brakes are applied while the vehicle is moving in a reverse direction and which does not interfere with the normal operation of the brakes during the forward movement of the vehicle.

Another object of the invention is to provide automatic brake adjusting means which will operate in conjunction with a conventional type of vehicle brake.

Still another object of the invention is to provide a brake adjusting mechanism of this type which will prevent overadjustment of the brakes.

A further object of this invention is to provide an automatic brake adjusting mechanism which may be installed on a conventional brake without material alteration of the brake structure and which is distinguished by its simplicity of assembly and ease of installation.

A still further object is to provide an automatic brake adjuster mechanism the construction of which makes it particularly suitable for and adapted for use with a web-ledge type of brake.

Another object is to provide a simple but effective means which acts to hold the webs of the brake shoes on the backing plate ledges and which also supports the adjusting lever of the mechanism for sliding movement on the web of the brake shoe. With this construction, the device is simplified, made more compact, and its cost is reduced.

Therefore, another object of this invention is to provide a device of this type which approaches the ultimate in structural simplicity and thus may be manufactured and assembled at a nominal cost.

The various objects and advantages, and the novel details of construction of one commercially practical embodiment of the invention, will become more apparent as this description proceeds, especially when considered in connection with the accompanying drawings, in which:

FIGURE 1 is a plan view of a brake assembly showing the invention;

FIGURE 2 is a fragmentary sectional elevational view taken substantially on the plane indicated by line 2—2 in FIGURE 1; and FIGURE 3 is a fragmentary detail sectional view taken substantially on line 3—3 in FIGURE 1.

An embodiment of the invention is shown in the drawings as applied to a brake structure of the internal expanding wedge-ledge type comprising arcuate brake shoes adapted to cooperate with the inner surfaces of the brake drum. In FIGURE 1, the reference character 10 indicates a brake drum mounted on the wheel hub of a vehicle (not shown) for rotation therewith. A stationary backing plate 11 is mounted on a stationary part (not shown) of the vehicle.

The basic elements of the brake structure comprise a pair of brake shoes 12 and 13 in the form of arcuate segments, said brake shoes being provided with arcuate rim portions 14 and 15 supporting lining elements 16 and 17, respectively. The rim portions 14 and 15 are usually reinforced against flexure by web portions 18 and 19 extending perpendicularly from the rim portions 14 and 15.

The adjacent ends 20 and 21 of the brake shoes 12 and 13 engage an anchor pin 22 fixed to the backing plate 11. The opposite adjacent ends 23 and 24 of the brake shoes 12 and 13 engage an adjusting strut 25, the two ends 23 and 24 being retained in engagement with the adjusting strut by means of a tension spring 26.

A hydraulic wheel cylinder 27 having plunger members 28 and 29 extending from opposite ends thereof into engagement with the webs 18 and 19 provides the actuating device for moving the brake shoes 12 and 13 into engagement with the brake drum 10. The plungers 28 and 29 extend from piston members (not shown) within the cylinder 27, hydraulic fluid being delivered into the wheel cylinder 27 between the piston members from a conventional pedal operated master cylinder (not shown). A retraction spring 30 normally holds the ends 20 and 21 of the brake shoes in engagement with the anchor pin 22 when hydraulic pressure is released from the wheel cylinder 27. The brake shoes are resiliently urged toward the backing plate by a special type of holddown spring, yet to be referred to. The webs 18 and 19 of the brake shoes engage a plurality of ledges 31 formed on the backing plate 11 to slidably support the brake shoes on the backing plate 11. These ledges 31, as is customary, are formed by pressing portions of the backing plate 11 out of the plane thereof, as indicated in FIGURES 2 and 3.

In the type of brake thus far described, it will be understood that the brake shoe 13 constitutes the secondary shoe and that this shoe moves away from the anchor pin 22 when the brake is applied while the vehicle is moving in reverse and the brake drum is moving in the direction of arrow A in FIGURE 1. As will be explained more fully hereinafter, the means for adjusting the brake shoes operate only when the brake is applied while the vehicle is moving in a reverse direction and a lost-motion connection between the operating mechanism and the brake adjusting lever is provided so that if the clearance between the brake shoe and drum is correct, and the brake needs no adjusting, this lost-motion connection will prevent movement of the brake adjusting lever and thus prevent over-adjustment of the brakes.

The adjustable strut for adjusting the brake shoes, indicated generally by the reference character 25, comprises a tubular internally threaded nut 35 which receives the threaded stem 36 of the adjusting portion of the strut. The stem 36 has a nonthreaded portion 37. The other end 38 of the nut 35 is slotted or bifurcated to receive the end 23 of the web 18 of the brake shoe 12, thus preventing rotation of the nut 35. The nonthreaded portion 37 carries a sleeve 39 having a bifuracted portion 40 which engages the web 19 of the end 24 of the brake shoe 13. A toothed wheel 41 is formed integrally with the stem 36 and the teeth of this wheel provide a ratchet for turning the tooth wheel 41.

The structure thus far described is substantially conventional in modern-day brakes and the present invention relates to the means for adjusting the strut 25 automatically and for holding the brake shoes and the adjusing lever in operative position.

The adjusting mechanism comprises an adjusting lever 50 having an end portion 51 functioning as a pawl to engage the toothed wheel 41 to rotate the same. The lever 50 is slidably mounted on the web 19 of the adjacent brake shoe 13 in such a manner as to be capable of sliding movement toward and away from the toothed wheel 41 so that its pawl portion 51 can rotate the toothed wheel and thus adjust the adjustable strut 25 when the adjusting lever is moved in one direction.

The adjusting lever 50 is actuated by a second or rockable lever 52 which is pivotally mounted as at 53 on the end of a wire or strut 54, the other end of which is connected, as for instance, by being wrapped around the anchor pin 22, as indicated at 55. Thus, the rockable lever 52 is pivotally mounted on a fixed part of the brake structure; i.e., the anchor pin 22, albeit a distance therefrom.

The rockable lever 52 has a laterally extending end or lug 56 which engages an aperture 57 in the brake shoe web 19 to provide a pivotal connection therebetween. Thus, when the brake shoe is moved in the direction of arrow A, the other end of the rockable lever 52 will be moved in an arc, indicated by the arrow B.

A lost-motion connection is provided between the rockable lever 52 and the adjusting lever 50 and this consists of a tension spring 58 which has one end connected to an upstanding lug 59 on the adjusting lever 50 and the other end connected to an upstanding lug 60 on the lower end of the rocking lever 52.

As has previously been described, and as shown in FIGURES 2 and 3, the adjusting lever 50 is slidably mounted on the web 19 of the adjacent brake shoe 13 so that it may move relative thereto. When the adjusting lever 50 partakes of its sliding movement in one direction, the end 51, functioning as a pawl, engages the teeth on the toothed wheel 41 to adjust the adjustable strut 25.

If the brake shoes do not need adjusting, or movement of the adjusting lever 50 is prevented for some other reason, the lost-motion connection between the levers, consisting of the spring 58, will permit the movement of the rocking lever 52 without any movement of the adjusting lever 50. At this time, the spring 58 is merely extended, but no movement is imparted to the adjusting lever 50.

In order to simplify the construction and render the same more compact and easy to assemble, there is provided a brake shoe holddown spring 70, see FIGURE 2, which is substantially U-shaped when assembled. The holddown device 70 consists of two sections or wire members 71 of spring wire, the outer ends of which are secured to the backing plate 11 as, for instance, by having a headed portion 72 formed thereon engaging the periphery of an aperture 72a. The adjacent ends of the wire members or sections 71 are connected together by means of a sleeve member or the like 73 which is crimped over the adjacent end of the wire sections 71. The holddown device 70 is provided with laterally offset loop portions 74 which extend through slots 75 in the adjusting lever 50 so as to engage the web 19 of the adjacent brake shoe (see particularly FIGURE 2). These slots 75 permit movement of the adjusting lever 50 without interference from the holddown spring 70. The sleeve member 73 bears against and frictionally engages an adjacent portion of the adjusting lever 50 to hold the same against the web 19 and to frictionally control the movement of the adjusting lever. If desired, one or more additional loops 76 may be formed in the holddown device 70 to bear against the adjusting lever 50 to hold the same in contact with the web 19 of the brake shoe.

If desired, a spring 77 may be provided having one end secured to the rocking lever 52 through the pivot opening 78 with which the wire or strut 54 is pivotally connected. The other end of the spring 77 is connected as at 79 to the adjusting lever 50. This spring assists in returning the parts to their normal position illustrated in FIGURE 1 and also acts to hold the several parts against rattling.

In operation, when the brake drum moves in the direction of arrow A, the lever 52 is rocked about its pivot 53 due to its pivotal connection with the brake shoe at 56-57. Thus, the lever 52 rocks in the direction of the arrow B to extend the spring 58 and slidably move the adjusting lever 50 toward the adjustable strut 25. This causes the pawl portion 51 of the adjusting lever to engage a tooth of the toothed wheel 41 to rotate the threaded stem 36 to lengthen the adjustable strut and thus adjust the brake shoes. As pointed out, the lever 50 slides on the web 19 of the adjacent brake shoe.

If the brakes have already been sufficiently adjusted, or, if for any other reason, the movement of the adjusting lever 50 is impeded, rocking movement of the lever 52 will merely cause an extension of spring 58 and no movement of the adjusting lever 50. This prevents an overadjustment of the brakes.

As will be obvious, the adjusting lever 50 is held in sliding contact with the adjacent web 19 of the adjacent brake shoe by the spring holddown device 70. This holddown device also, acting through the web 19, holds the brake shoe in engagement with the ledges 31. A similar type holddown device 70 is shown on the opposite side of the brake in FIGURE 1 which merely acts to hold the brake shoe in engagement with the ledges.

When the brakes are released, the spring 77 will return the adjusting lever to its initial position, which is its position of rest shown in FIGURE 1. The return movement of the brake shoe will move lever 52 to the position shown in FIGURE 1 by reason of the pivotal connection 56-57.

It will be apparent from the foregoing description that the mechanism is so constructed as to be simple, compact and economical. Thus, the device approaches the ultimate in structural simplicity and may be manufactured and assembled at a nominal cost.

While one commercially practical embodiment of the invention has been described and illustrated herein somewhat in detail, it will be understood that various changes may be made as may come within the purview of the accompanying claims.

What is claimed is:

1. In a web-ledge type brake, a pair of brake shoes provided with webs, a brake drum, an anchor, a backing plate provided with ledges engaging said webs to slidably support said brake shoes, means for moving said brake shoes away from said anchor and into engagement with said brake drum, a strut connecting adjacent ends of said brake shoes, and a rotatable toothed wheel for controlling the extension of said strut, that improvement which comprises, an adjusting lever slidably mounted on the web of one of said brake shoes and having a portion functioning as a pawl to engage said toothed wheel to rotate the same, a second lever connected to a fixed part of said brake structure and pivotally connected to said brake shoe for rocking movement thereby when said brake shoe is moved, a tension spring connecting adjacent ends of said levers whereby a rocking movement of said second lever will exert a pulling force on said spring to slide said adjustable lever in a direction to rotate said toothed wheel, said spring being extended to permit relative movement between said levers when said adjusting lever is held against movement, as for example when the brakes are sufficiently adjusted, and a substantially U-shaped spring wire device secured to said backing plate and slidably engaging said brake shoe and said adjusting lever to hold the latter in sliding contact with said brake shoe.

2. In a web-ledge type brake, a pair of brake shoes provided with webs, a brake drum, an anchor, a backing plate provided with ledges engaging said webs, means for moving said brake shoes away from said anchor and into engagement with said brake drum, a strut connecting adjacent ends of said brake shoes, and a rotatable toothed wheel for controlling the extension of said strut, that improvement which comprises, an adjusting lever slidably mounted on the web of one of said brake shoes and having a portion functioning as a pawl to engage said toothed wheel to rotate the same, a second lever connected to a fixed part of said brake structure and pivotally connected to said brake shoe for rocking movement thereby when said brake shoe is moved, a spring connecting the adjacent ends of said levers whereby a rocking movement of said second lever will slidably move said adjusting lever in a direction to rotate said toothed wheel, and a substantially U-shaped spring wire device having its legs secured to said backing plate and having an intermediate portion engaging said brake shoe to hold the same in engagement with said ledges and having a portion engaging said adjusting lever to hold the same in sliding engagement with said brake shoe web.

3. In a web-ledge type brake, a pair of brake shoes provided with webs, a brake drum, an anchor, a backing plate provided with ledges engaging said webs, means for moving said brake shoes away from said anchor and into engagement with said brake drum, a strut connecting adjacent ends of said brake shoes, and a rotatable toothed wheel for controlling the extension of said strut, that improvement which comprises, an adjusting lever slidably mounted on the web of one of said brake shoes and having a portion functioning as a pawl to engage said toothed wheel to rotate the same, a second lever connected to a fixed part of said brake structure and pivotally connected to said brake shoe for rocking movement thereby when said brake shoe is moved, a spring connecting the adjacent ends of said levers whereby a rocking movement of said second lever will slidably move said adjusting lever in a direction to rotate said toothed wheel, and a substantially U-shaped spring wire device having its legs secured to said backing plate, said spring device having a laterally extending loop portion intermediate its length extending through a slot in said adjusting lever and engaging the web of said brake shoe to hold the same in engagement with said ledges, said spring device also having a portion engaging said adjusting lever to hold the same in sliding engagement with said brake shoe web.

References Cited by the Examiner
UNITED STATES PATENTS

| | | | |
|---|---|---|---|
| 3,010,544 | 11/1961 | Dahle et al. | 188—79.5 |
| 3,050,157 | 8/1962 | Kenzik et al. | 188—79.5 |
| 3,114,438 | 12/1963 | Helvern | 188—79.5 |
| 3,186,519 | 6/1965 | Johannesen | 188—78 |

DUANE A. REGER, *Primary Examiner.*